US007007399B2

(12) United States Patent
Catalano

(10) Patent No.: US 7,007,399 B2
(45) Date of Patent: Mar. 7, 2006

(54) CONDUIT MEASURING TOOL—DEVICE FOR MEASURING THE LENGTH OF ELECTRICAL CONDUIT

(76) Inventor: Philip Joseph Catalano, 1420 Francis Ave., Orlando, FL (US) 32806-2448

( * ) Notice: Subject to any disclaimer, the term of this patent is extended or adjusted under 35 U.S.C. 154(b) by 174 days.

(21) Appl. No.: 10/646,501

(22) Filed: Aug. 22, 2003

(65) Prior Publication Data
US 2005/0039343 A1 Feb. 24, 2005

(51) Int. Cl.
G01B 3/12 (2006.01)

(52) U.S. Cl. .............................. 33/735; 33/1 PT; 33/732

(58) Field of Classification Search ................ 33/1 PT, 33/1 N, 732, 733, 734, 735, 736, 738, 743, 33/744, 745, 746
See application file for complete search history.

(56) References Cited

U.S. PATENT DOCUMENTS

| 3,091,038 | A | * | 5/1963 | Brand | 33/734 |
| 3,753,294 | A | * | 8/1973 | Attali et al. | 33/735 |
| 4,117,600 | A | * | 10/1978 | Guignard et al. | 33/735 |
| 4,798,003 | A | * | 1/1989 | Haglof | 33/734 |
| 5,351,531 | A | * | 10/1994 | Kerr | 33/734 |
| 6,640,451 | B1 | * | 11/2003 | Vinarcik | 33/1 PT |
| 6,745,487 | B1 | * | 6/2004 | Nield | 33/735 |

* cited by examiner

Primary Examiner—Christopher W. Fulton

(57) ABSTRACT

My invention described is an electronic and mechanical tool used to measure jet line or string for the purpose of measuring electrical conduit lengths. This new process eliminates the manual labor required before calculating how long the conduit is and how much feeder lengths are required. With the use of a permanent magnet and magnetic switch applied with a sheave that works together and timing to give input to a four decade up counter, the system senses the total number of feet measured by the jet line or string passing around the sheave and displays the total count on the foot meter.

2 Claims, 7 Drawing Sheets

CONDUIT MEASURING TOOL—DEVICE FOR MEASURING THE LENGTH OF ELECTRICAL CONDUIT

BACKGROUND OF THE INVENTION

This invention relates to a integrated mechanical and electronic system to give length measurements of electrical conduit above and below ground.

Over the years electricians have measured electrical conduits with a True Tape. True Tape is constructed of flat fiber string imprinted with foot increments. It has always been the procedure to vacuum in a seperate string in order to pull the True Tape through the conduit. Once the string is through the entire run of conduit the True Tape is then attached to the string. The True Tape must then be physically pulled through the conduit to the other end in order to get the readings on each end in feet. Subtracting the foot measurement at one end from the measurement at the opposite end has always been the only means to calculate the total number of feet of cable or conductor necessary.

One of the most formidable problems in using True Tape is brought on by the water that settles in underground conduits. This causes difficulty to pull the True Tape in because it sticks to the inner walls of the conduit, breaks easily and cannot be vacuumed in. These factors force the workers to manually pull the True Tape through. There is always that high risk of the True Tape breaking and they need to start at square one again.

Another drawback is that the synthetic fiber True Tape is composed of gets weighted down by the mud and water in the pipe and it causes drag and friction. Resulting in cutting and scoring along the pvc walls of extended lengths of conduit. There are many types of True Tape, yet even the larger sizes, that don't do such damage, still are required to be pulled in by hand.

This method of measuring has always been a slow process and uses vast amounts of man hours. Hence we need an accurate and reliable way of measuring the length of electrical conduit in the field. My invention is to provide a new way, that will avoid these problems.

BRIEF SUMMARY OF THE INVENTION

It is therefore the objective of this invention to provide an improved way of measuring electrical conduits.

It is a further objective of this invention to provide a fast and one time measurement, a simpler way of getting footage of cable or conductors which need to be measured without the use of True Tape and mistakes of calculations in math.

It is a further objective of this invention to save labor time and cost of True Tape.

It is a further objective of this invention as to not damage internal walls of pvc through the use of True Tape in long lengths of conduit.

The invention results from the realization that a simple sheave with a magnetic switch to count the rotations of each foot of string or jetline gives a reading of footage on a display and no other labor or work is required.

BRIEF DESCRIPTION OF DRAWINGS

Other objects, features and advantages will occur to those skilled in the art from the following description of a preferred embodiment and accompanying drawings.

DETAILED DESCRIPTION OF THE INVENTION

The first event in sequence of the measurement is to attach the jetline to a conduit piston, which is called a rat by electricians in the field. This is a common name used for a conduit piston. This is a device which travels inside the conduit and pulls the jetline through the conduit. After connecting the rat to a jetline and putting one wrap of the jetline around the sheave [FIG. 1, Page 9] the rat is now inserted into the open end of the conduit. We are now set up to start the vacuum on the opposite side of the conduit run. This can be hundreds of feet away. This side is set up as follows. The vacuum hose is attached to the open end of the conduit and then it is turned on. At this moment the low pressure is creating a low pressure inside the conduit which will pull the rat and the jetline through at a high rate of speed. In a few seconds the rat will travel the distance from the sheave end to the shop vac end. You will hear a pop as it hits the vacuum hose. Now we can look at the foot meter and record the footage measured by the rotation of the sheave and the magnetic switch input to the counter of the conduit run length This is the basic function of the measurement and how it is set up. This is a simple operation and basically how a string or jet line is used in the electrical trade. Note the jetline or string also is installed to pull in a rope and a small rope to pull in a larger rope to pull in cables and feeders in electrical work. So we must always install a jetline or a string into a conduit to accomodate the use of ropes to pull in the cables or feeders.

Figure 1:
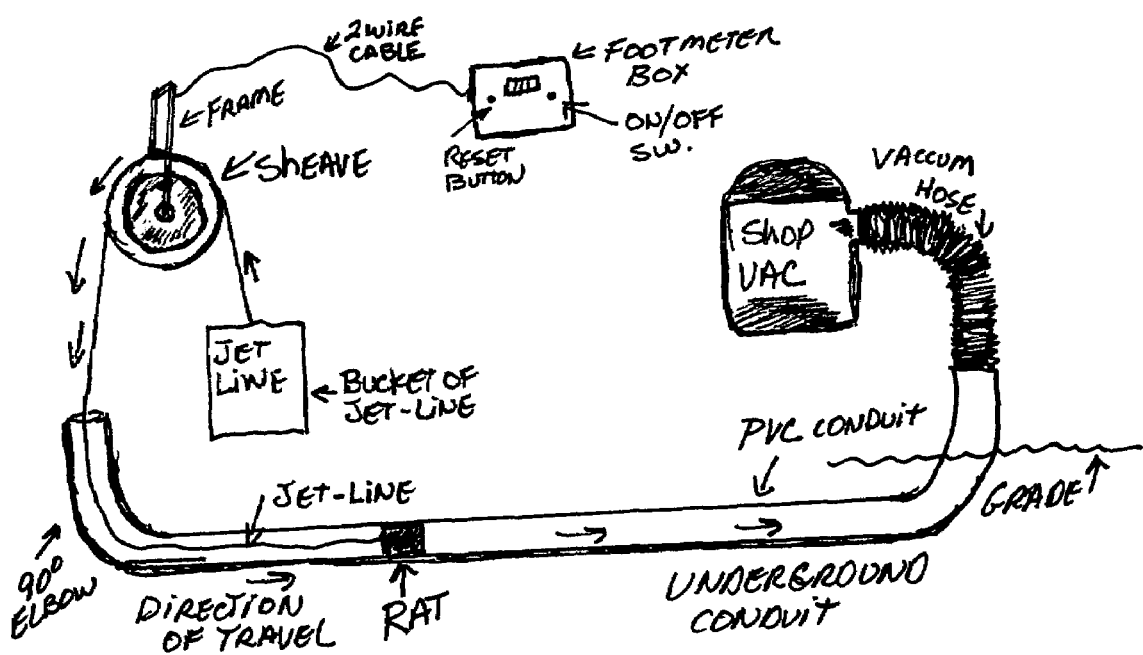
FIG. 1, Page 9 Is an overall view of the process and function of said invention

[As the jetline pulls the sheave and the sheave rotates the permanent magnet passes the Cancelled] With As the movement of jetline rotates the sheave [FIG. 1, Page 9] at high sped, jetline translocates to rounded sidewall to align with permanent magnet. As sheave rotates permanent magnet passes magnetic switch to count rotation of length of run of travel. During a run, the rat impacts a bend or kick 90 degree elbow of radius. This impact slows jetline speed and a translocation, a degression occurs. At this moment in time a slip is now performed. This slip is the time of travel in a radius jetline slips but sheave does not slip. Additive count is made by permanent magnet passing magnetic switch it closes the contact, of the normally open contact. It is now fed to the debounce circuit, which is a two input Nand Schmitt trigger, to count the magnetic switch input and the reset switch input. All outputs of the CD 4093 debounce circuit have equal source and sink currents and conform to standard B Series output drives. This means total noise immunity for a clean and conditioned output of pin 3 to the count input on pin 32. [FIG. 3, Page 11]

Figure 3:
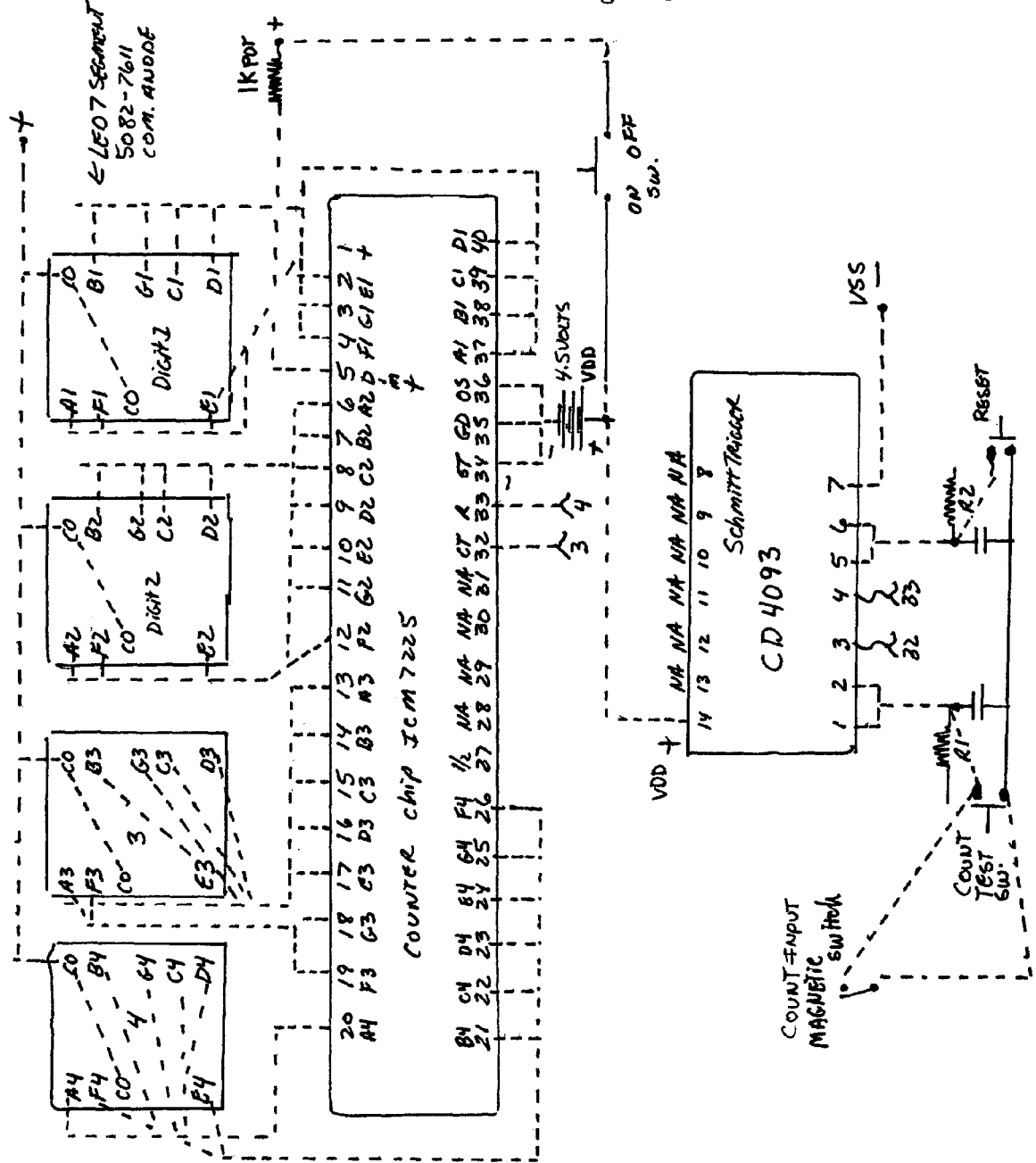
FIG. 3, Page 11 A schematic of the counter and circuits of the debounce chip, switches, reset button, count test button, sheave magnetic switch and wiring of said.

This discharges the CI capacitor on the CD 4093 chip, the nand gate now changes state on the output of pin 3 [FIG. 3, Page 11]. Pin 3 goes to the input on pin 32 on the ICM 7225 chip which is now negatively triggered. This starts the count mode. The ICM 7225 is a counter decoder and driver. Upon a negative triggered input on pin 32 [FIG. 3, Page 11], it starts the count cycle. It has 4 J-K flip flops independent circuits which count digit 1, digit 2, digit 3, digit 4.

Each digit, is controlled by four individual J-K flip flop circuits. There's a total of sixteen for all the digits to be displayed on the foot meter. Four J-K flip flops create the four bits of this code, in binary numbers. Each digit and each J-K flip flop circuits controls one digit at a time. Four bits of this code is a count. Each count changes the code by the count of the magnetic switch [FIG. 2, Page 10].

Figure 2:
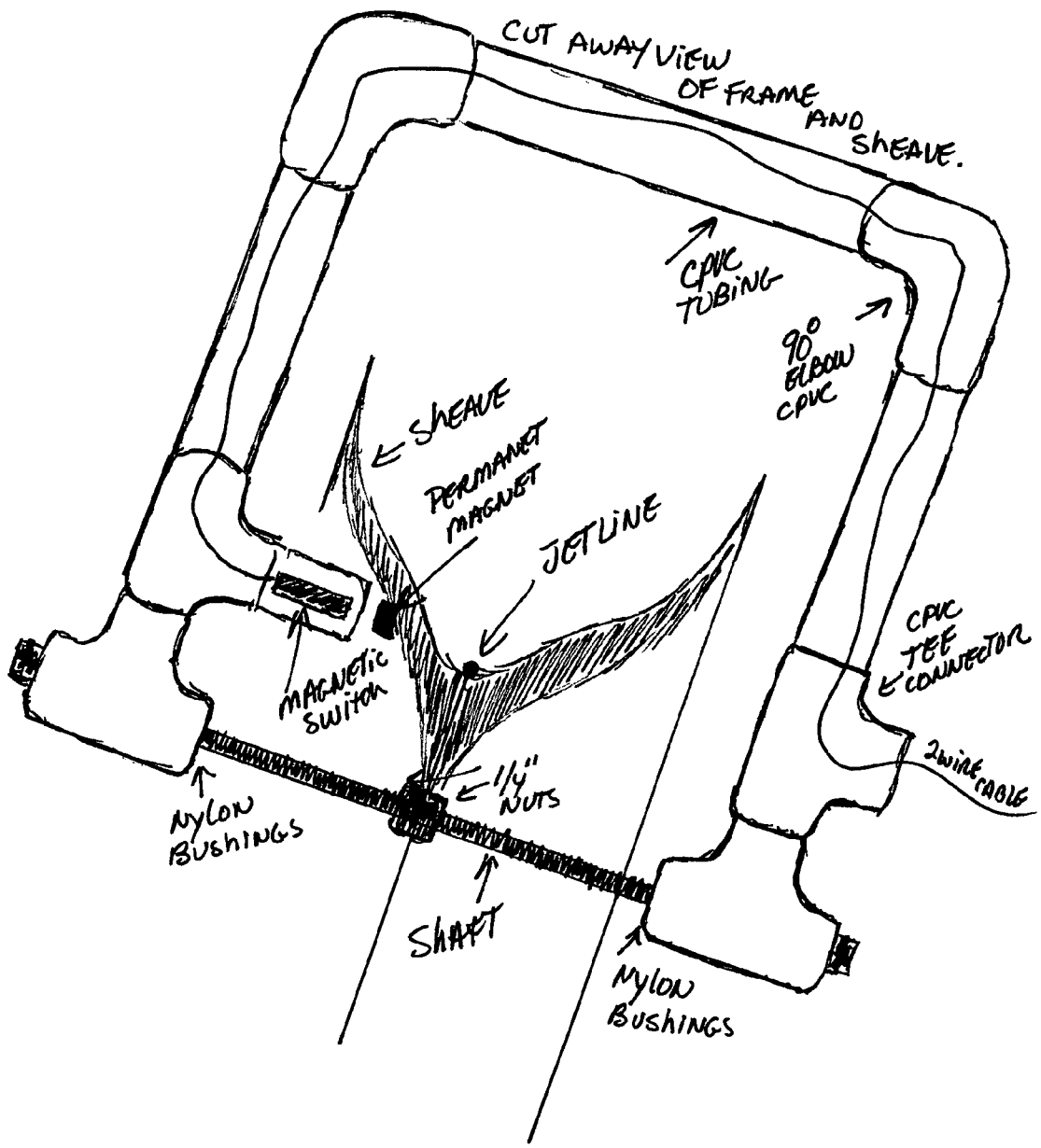
FIG. 2, Page 10 Cutaway view of the sheave frame, shaft, permanent magnet and magnetic switch.
Figure 4:
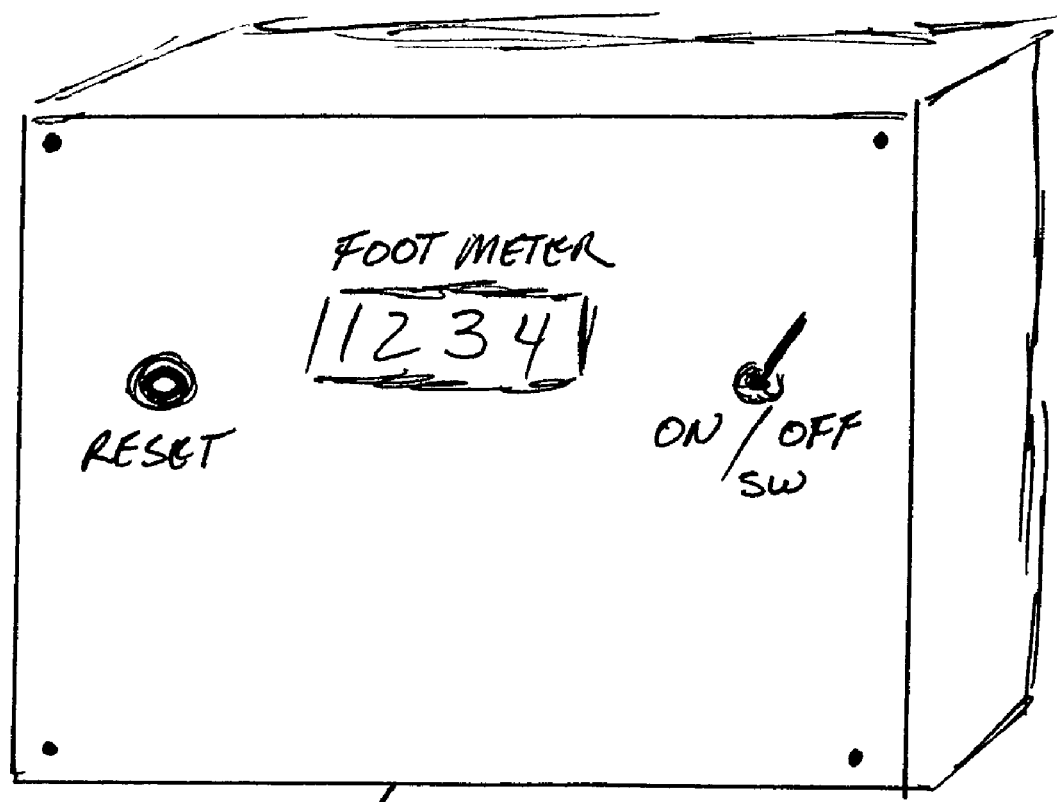
FIG. 4, Page 12 A view of the control box front cover which shows foot meter centered. To the right the on/off switch, and to the left the reset button for zero. Water proof box.
Figure 5:
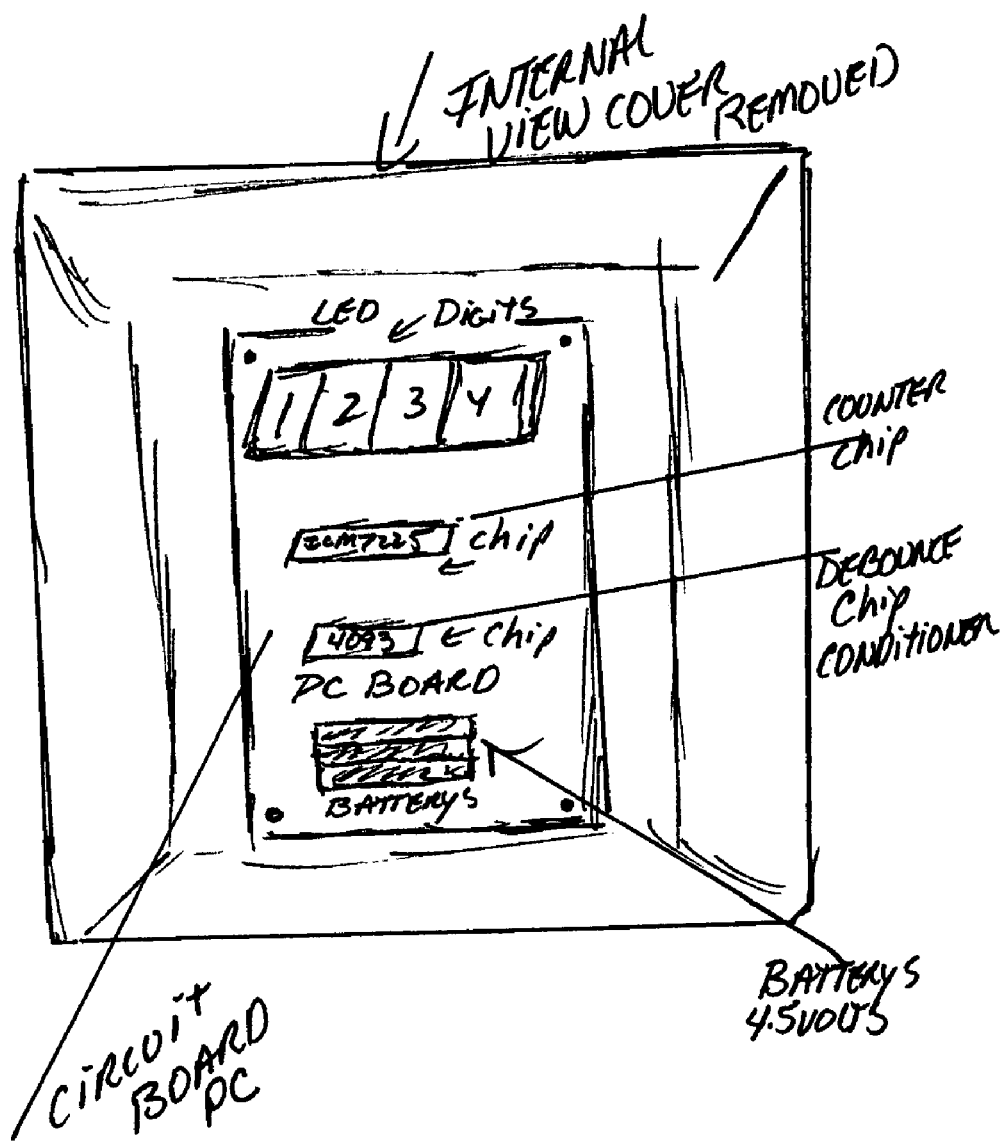
FIG. 5, Page 13 A view of the internal control box with the cover removed, showing the counter chip, digital led, pc board, batteries and the debounce chip.
Figure 6:
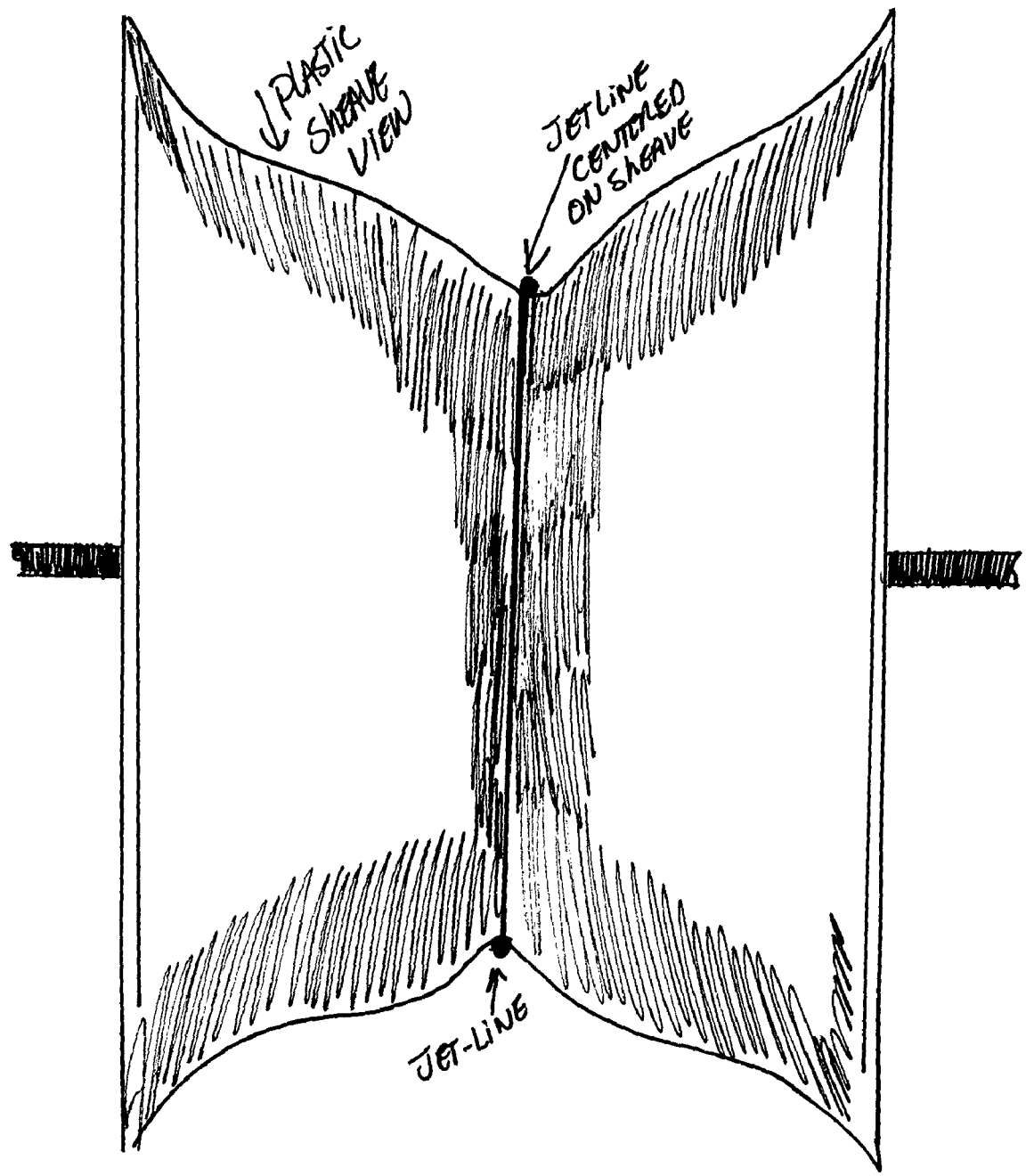
FIG. 6, Page 14 A view of the sheave shown and the placement of the string centered on the sheave.
Figure 7:
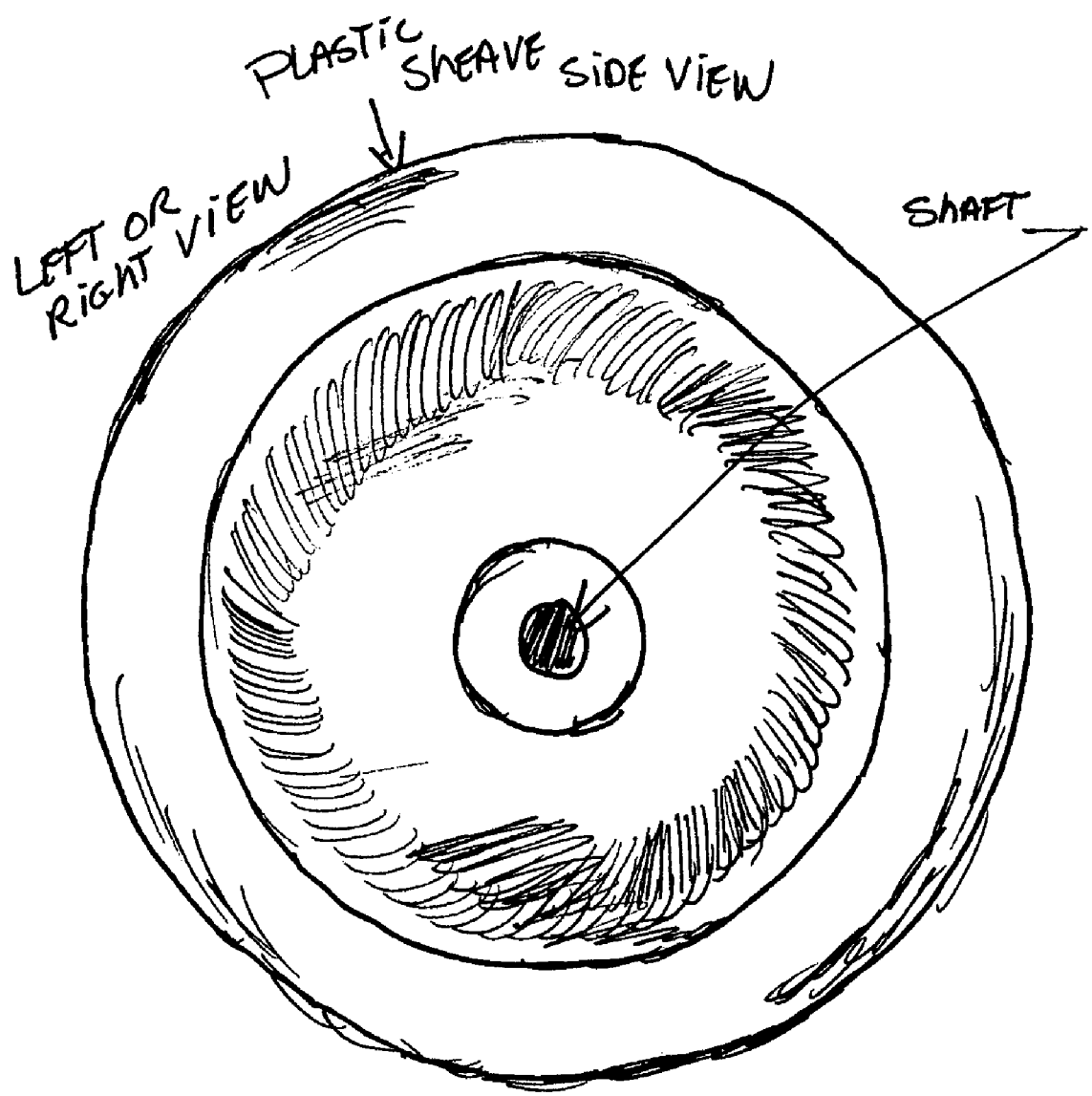
FIG. 7, Page 15 A view of the side, left or right, of the sheave showing the location placement of the permanent magnet.

Each binary code is decoded to a proper segment assignment of the digit number which is to be displayed on the foot meter [FIG. 4, Page 12] by the count of the magnetic switch [FIG. 2, Page 10]. There is also a latch circuit for store on each digit and an individual driver circuit on each digit. The driver is a direct drive to the LED's segments and does not require segment resistors. It's a direct drive system. The connection is a non-multiplexed. The driver feeds each of the seven segments of each of the digit displays. So we have a complete counter decoder and driver in one small package. This is very coinpact, and easy to assemble on a PC board [FIG. 5, Page 13]. The battery powered unit uses three double A 1.5 volt batteries, connected in series to give 4.5 volts. [FIG. 5, Page 13].

The chip uses less than 10 UA of power total. The display is a 5082-7611 Hewlett Packard type, efficient LED display is centered in the counter box cover. [FIG. 4, Page 12]. To the left on the counter box cover is the reset momentary push botton. This is used for zeroing the foot meter after a measurement has been taken and recorded. On the right of the counter box cover is the on/off switch. The foot meter is centered between the two switches. [FIG. 4, Page 12]. Note that the count test switch is located inside the box and is used to test the count when the batteries are replaced.

The counter is reset by taking the reset pin 33, low or negative. The on/off switch as shown feeds a positive to pin 1. Note also the 1k pot limits the brightness of the LED display. This chip is one complete stamp package with less parts and circuits to put together on one board, and is very benificial to the electronics, circuits not needed. Less problems with connections and soldered joints. [FIG. 3, Page 11]

This will make electricians working in the field and measuring conduit lengths everyday an efficient and new way of performing their jobs with accuracy and speed to save time, labor hours, and less material used or wasted.

What I claim as my invention is:

1. A conduit length measuring mechanical electronic tool for determining the length of an electrical conduit comprising: a rotational length measuring assembly engaging a jetline, the rotational length measuring assembly having a rotating magnetically coupled circuit to generate a signal in response to the jetline movement; a counter and circuits for receiving the signal and processing the signal and to calculate length in feet of the jetline movement passing through assembly; the rotational length measuring assembly further having a rotating sheave with rounded inner and outer side walls, the inner side walls forming a deep grooved center circumference engaging the jetline and rotating in response to the jetline movement; and a permanent magnet attached to the rounded outside wall of the sheave, magnetically coupled to a magnetic switch to generate a signal or rotations.

2. A conduit length measuring mechanical electronic tool of claim 1, wherein the counter and circuits for receiving the signal further comprises:
   a debounce circuit to limit the generated signal of the magnetic switch; and
   a digital feet meter display to view measurement of jetline movement in length of feet of measured conduit.

* * * * *